(No Model.)

J. G. BLOUNT.
BICYCLE.

No. 323,289. Patented July 28, 1885.

Witnesses
A. O. Orne
John F. C. Prinkloh

Inventor
John G. Blount
by
Crosby Gregory
Attys.

UNITED STATES PATENT OFFICE.

JOHN G. BLOUNT, OF BOSTON, MASSACHUSETTS, ASSIGNOR OF ONE-HALF TO HARRY M. CLARK, OF NEW YORK, N. Y.

BICYCLE.

SPECIFICATION forming part of Letters Patent No. 323,289, dated July 28, 1885.

Application filed August 12, 1884. (No model.)

*To all whom it may concern:*

Be it known that I, JOHN G. BLOUNT, of Boston, county of Suffolk, State of Massachusetts, have invented an Improvement in Bicycles, of which the following description, in connection with the accompanying drawings, is a specification, like letters on the drawings representing like parts.

My invention, relating to bicycles, has for its object to provide a simple and convenient attachment for preventing a bicycle of usual construction, having a large wheel in front for propelling and steering, from overturning forward or in the direction toward which the bicycle is moving, and thus preventing the most serious accidents to which bicycle-riders are liable, and enabling the bicycle to be ridden with safety and comfort over rough roads and in the night-time, when it is difficult to distinguish and avoid obstructions.

The invention consists, essentially, in a light auxiliary or supporting frame-work adapted to be connected with the front fork or portion of the bicycle frame-work, supported on the front wheel, the said auxiliary frame being provided with an auxiliary wheel supported by it in line with the front or driving wheel, and in front of the said wheel, preferably at a short distance above the ground, so that in case the front fork or frame-work of the bicycle turns forward on the hub of the driving-wheel, tending to throw the rider's center of gravity in front of its normal point of support on the said driving-wheel, the said auxiliary wheel will come to a bearing on the ground and prevent farther forward movement of the frame-work relative to the driving-wheel, thus enabling the rider to recover his normal position instead of being thrown forward to the ground.

Bicycles have been made having small wheels both at the front and rear of the main driving and steering wheel; but both the said wheels have been connected directly with the main frame-work of the bicycle, which has to be specially constructed to accommodate the said wheel, and the forward wheel, with its frame-work, was not detachable from the remainder of the bicycle, and could not be attached to a bicycle of ordinary construction.

Figure 1:
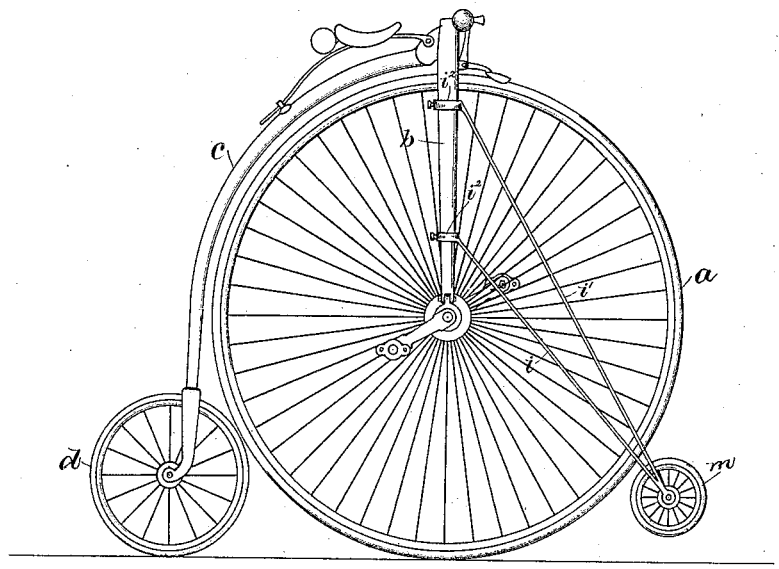
Figure 2:
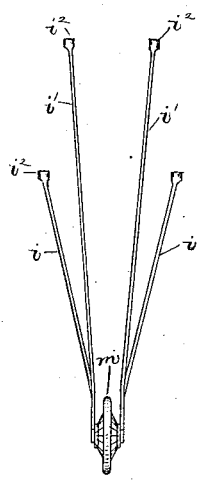
Figure 3:
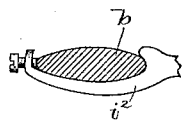

Figure 1 is a side elevation of a bicycle provided with an attachment embodying this invention; Fig. 2, a front elevation of the safety attachment removed from the bicycle; Fig. 3, a detail showing the clamp engaging the bicycle-fork.

The invention is applicable to bicycles of any construction of that class in which the main or driving wheel $a$ has the bearings for its hub or axle in a fork, $b$, pivotally connected above the periphery of the said wheel, with a backbone, $c$, supported on a smaller wheel, $d$, the said fork $b$ being nearly vertical, and the rider's seat being on the backbone near to its junction with the said fork, so that the rider's weight is nearly over the axle of the front wheel, but slightly at the rear of the point of contact of the said wheel with the ground. This arrangement affords the rider great advantage in propelling the bicycle, but is attended with some danger, as his weight being so nearly over the point of contact of the front wheel with the ground, it is easy, in case the momentum of the bicycle is suddenly checked, as by the front wheel meeting an obstruction, or in case its forward inclination is suddenly increased, as by the front wheel passing down a sudden depression, while the rear wheel, $d$, remains above such depression, for the rider's weight to be thrown in front of the point of support on the front wheel, when it will be difficult or impossible for the rider to recover his former position and a fall will ensue.

My invention is intended to prevent such accidents without decreasing the efficiency of the machine; and it consists, essentially, in an attachment composed of a light auxiliary frame, $i\,i'$, consisting of rods or tubes provided with clamps $i^2$, by which it may be connected with the front fork, $b$, above the hub of the wheel $a$, the said rods converging toward and meeting a point in front of the periphery of the main wheel $a$, where they constitute a bearing for an auxiliary wheel, $m$. The upper rod, $i'$, is longer than the lower rod, and is attached to the fork $b$ near its upper end, the said rods $i\,i'$ thus constituting a rigid or braced frame at each side of the bicycle. In attaching the auxiliary or supporting frame $i\,i'$ to the fork $b$ it may be set to bring the wheel $m$ at any desired distance above the ground or plane tangent to the wheels $a\,d$, and in practice the auxiliary or supporting wheel $m$ will be placed, preferably, about two or three inches above the ground.

When the bicycle is moving in normal condition, or with the wheels *a d* resting on the ground, the wheel *m* will not operate, but, being light, will produce little or no disadvantage to the rider; and in case the rider should be thrown forward together with the frame *b c*, the wheel *m* will come to a bearing on the ground in advance of the point of support of the main wheel *a*, forming a new point of support sufficiently far in advance to restrain the farther forward movement of the rider, who will thus be enabled, after a moment, to recover and throw his weight, together with the framework of bicycle, back to the normal position.

The frame *i i'* may be attached to the fork *b* in any convenient manner, as by bolts or screws, and, as shown in Fig. 3, the upper ends of the rods are provided with sockets adapted to engage the fork and be securely held thereon by set-screws.

I claim—

1. The herein-described bicycle attachment, consisting of a frame having an auxiliary bicycle-supporting wheel, and being adapted to be attached to the front fork of the bicycle at each side of the driving-wheel, and between the hub of said wheel and the main frame or backbone, substantially as set forth.

2. The herein-described bicycle attachment, consisting of a frame having an auxiliary bicycle-supporting wheel, the said frame being composed of rods *i i'*, arranged at each side of the driving-wheel, and provided with clamps adapted to be adjustably secured to the arms of the fork between the hub of the driving-wheel and the main frame or backbone, whereby the said auxiliary frame may be adjusted to cause the auxiliary wheel to be supported at different heights from the ground, substantially as described.

In testimony whereof I have signed my name to this specification in the presence of two subscribing witnesses.

JOHN G. BLOUNT.

Witnesses:
    JOS. P. LIVERMORE,
    W. H. SIGSTON.